Patented Feb. 16, 1926.

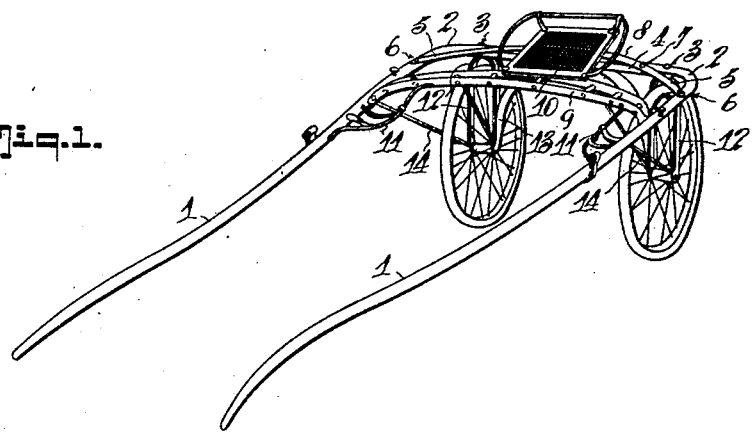

1,573,318

UNITED STATES PATENT OFFICE.

JOSEPH HUBER, OF BOZEMAN, MONTANA.

RACING SULKY.

Application filed June 22, 1925. Serial No. 38,833.

*To all whom it may concern:*

Be it known that I, JOSEPH HUBER, a citizen of the United States, residing at Bozeman, in the county of Gallatin and State of Montana, have invented certain new and useful Improvements in a Racing Sulky, of which the following is a specification.

The invention has for its object to provide a simply and efficiently designed racing sulky having the qualities of being relatively light of weight, substantially flexible of assemblage facilitating the easy dissipation of road shock and consequent easy riding and longevity, and in which the wheels are so mounted as not only to aid the qualities of flexibility and longevity above referred to but also to make possible the elimination of some undesirable and cumbersome braces and to very effectively prevent interlocking of wheels should two or more sulkies casually engage or collide on the roadway.

With the above and other objects in view that will hereinafter appear, the invention further resides in the novel details of construction, combination and arrangement of parts, all of which will be first fully described, then be particularly pointed out in the appended claims, reference being had to the accompanying drawing, in which:—

Figure 1 is a front quarter perspective view of the sulky.

Figure 2 is a rear perspective view of the invention.

Figure 3 is a central vertical cross section of the rear upper portion of the sulky.

In the drawings in which like numerals of reference indicate like parts in all the figures 1 indicates the shafts which are curve-shaped as shown and which terminate at their ends with well curved portions 2 suitably secured, as at 3, upon the rear cross bar 4. The rear end of the sulky and principally the rear shaft ends and cross bar just referred to are braced by the bowed brace 5 so curved that when it ends are secured as at 6 to the curved portions 2 of the shafts and secured at 7 to the rear cross bar 4, a portion 8 thereof will be bowed out rearwardly from the said cross bar.

A truss circle 9, secured across between the shafts 1 just in advance of the ends of the brace 5, serves to flexibly truss the body of the sulky body against lateral strains and road shock.

The rear portion of the truss circle 9 and the rearwardly bowed portion 8 of the brace 5 serve as front and rear supports for the drivers seat 10 thus providing a particularly well balanced and comfortably flexible mounting therefor.

The usual foot rests 11 are secured to the shafts 1 and truss circle 9, one at the juncture thereof at each side.

An inverted U bracket 12 is secured to depend from each end of the rear cross bar 4 and, intermediately of the two brackets 12, a pair of bowed braces 13 are secured as indicated to securely brace the said brackets against lateral strains. And a single pair of light weight brace rods 14, extending forwardly-upwardly between the lower ends of each bracket 12 and the truss circle complete the simple but thoroughly efficient bracing for the usual pneumatic wheels mounted in the said brackets 12.

The body of the sulky at the portions 2 of the shafts has an over-all width of 48" while the wheel base is but 33". By thus positioning each wheel 7½" from the respective sulky side limit, interlocking of wheels by reason of casual contact or collision while racing and the ills and dangers incident thereto are efficiently eliminated.

The sulky is so constructed as to be particularly desirable for reasons of comfortable and safe riding and for that the same is adaptable to use on any and all tracks considerate of riding and equipment rules and with a small or large horse, trotter or pacer.

The truss circle aids in providing a strong and durable yet flexible body and eliminates some troublesome bracings commonly used.

A single simple set of braces is alone necessary cooperative with each wheel bracket 12, the inner rods of the braces each being 17½" long and the outer ones 22½". The relatively shortness of these braces provide plently of leg room for the horse being driven.

The mounting of the seat upon the bowed portion 8 also provides for a great deal of shock absorption and consequent long life and riding ease, taking much of the jar out of rough tracks.

From the foregoing description, taken in connection with the accompanying drawing, it is thought the novel details of construction, the manner of use and the advantages of the invention will be readily apparent to those skilled in the art to which it relates.

Having thus described my invention, what I claim as new and desire covered by Letters Patent is:

1. A sulky of the class described comprising curve-shaped shafts having well curved inturned rear end portions, a rigid rear cross bar upon each end of which one shaft rear end is secured, a truss circle secured between the shafts in advance of the rear cross bar, a bowed brace secured at its ends to the shafts and to the rear cross bar and having its rear bowed portion extending beyond and over the said cross bar, means positioned inwardly of each end of the cross bar for mounting a wheel, and a seat secured at its front end upon the truss circle and at its rear end upon the extended bowed portion of the bowed brace.

2. A sulky of the class described comprising shafts joined at their rear ends by a cross bar, a truss circle secured between the shafts in advance of the cross bar, a bowed brace secured at its ends to the shafts and having a rearwardly bowed portion extending beyond and over the cross bar, a seat mounted at its front end upon the truss circle and at its rear end upon the rearwardly extending portion of the bowed brace, and means secured beneath the cross bar and inwardly of the lateral limits of the shafts for supporting wheels.

3. A sulky of the class described comprising shafts joined at their rear ends by a cross bar, a truss circle secured between the shafts in advance of the cross bar, a bowed brace secured at its ends to the shafts and having a rearwardly bowed portion extending beyond and over the cross bar, a seat mounted at its front end upon the truss circle and at its rear end upon the rearwardly extended portion of the bowed brace, and means secured beneath the cross bar and inwardly of the lateral limits of the shafts for supporting wheels, said mounting means including an inverted U bracket secured beneath the cross bar, short upwardly-forwardly extending brace rods secured between the lower ends of the brackets and the truss circle, and a lateral bowed brace member secured to the inner side of each bracket and to the cross bar.

JOSEPH HUBER.